(12) United States Patent
Bartsch

(10) Patent No.: US 7,466,718 B2
(45) Date of Patent: Dec. 16, 2008

(54) DECODING DEVICE FOR ANALYZING COMMUNICATION PROTOCOLS

(75) Inventor: Wolfgang Bartsch, Berlin (DE)

(73) Assignee: Tektronix, Inc., Beaverton, OR (US)

( * ) Notice: Subject to any disclaimer, the term of this patent is extended or adjusted under 35 U.S.C. 154(b) by 1226 days.

(21) Appl. No.: 09/832,416

(22) Filed: Apr. 10, 2001

(65) Prior Publication Data

US 2001/0053153 A1 Dec. 20, 2001

(30) Foreign Application Priority Data

Jun. 19, 2000 (EP) .................................. 00112896

(51) Int. Cl.
*H04J 3/16* (2006.01)
(52) U.S. Cl. ....................... 370/465; 370/469
(58) Field of Classification Search ................. 370/241, 370/242–252, 465, 469; 379/1.01, 21, 10.03, 379/27.04; 375/213, 224; 709/223–224
See application file for complete search history.

(56) References Cited

U.S. PATENT DOCUMENTS

| | | | | |
|---|---|---|---|---|
| 5,347,524 A | * | 9/1994 | I'Anson et al. ................ 714/39 |
| 5,793,954 A | * | 8/1998 | Baker et al. .................. 709/250 |
| 5,805,571 A | | 9/1998 | Zwan et al. | |
| 5,826,017 A | * | 10/1998 | Holzmann .................... 709/230 |
| 5,826,018 A | * | 10/1998 | Vixie et al. .................. 709/230 |
| 5,850,388 A | * | 12/1998 | Anderson et al. ........... 370/252 |
| 6,000,041 A | | 12/1999 | Baker et al. | |
| 6,564,265 B2 | * | 5/2003 | Tillmann et al. ............. 709/246 |
| 6,665,725 B1 | * | 12/2003 | Dietz et al. .................. 709/203 |

OTHER PUBLICATIONS

Yang, Protocol Compatibility Tester for CDMA Mobile Systems (CMS), IEEE, pp. 96-101.*

* cited by examiner

*Primary Examiner*—Frank Duong
(74) *Attorney, Agent, or Firm*—Francis I. Gray; Matthew D. Rabdau; Michael A. Nelson

(57) ABSTRACT

A decoding device for analyzing communication protocols has a generic decoder into which at least one protocol description of a communication protocol is loaded, the at least one protocol description being capable of being interpreted by the generic decoder. The decoding device also has a specific decoder designed for a certain protocol description. The generic and specific decoders are reversibly connected.

4 Claims, 2 Drawing Sheets

DECODING DEVICE FOR ANALYZING COMMUNICATION PROTOCOLS

BACKGROUND OF THE INVENTION

The present invention relates to protocol testers, and more particularly to a decoding device for analyzing communication protocols and to a method for setting up such a decoding device.

In communication technology communication between several participants takes place according to so-called communication protocols, i.e., sets of rules that are agreed upon for the communication which the communication facilities taking part in the communication must observe. For monitoring communication networks, and particularly for testing communication networks following the replacement of a communication instrument or the extension of the network by further communication instruments, tests to ensure the functioning of the communication network or to render support in trouble-shooting are carried out using protocol testers, especially before commissioning in order to avoid operational failures.

Such protocol testers require a decoding device that allows the protocol testers to apply the particular communication rules to the data picked up or received at a terminal unit so as to decode the data for further processing. Because of the frequently changing protocols to be analyzed, particularly with reference to the equipment and/or manufacturers of specific or proprietary protocols, such decoding devices have to be designed to be as flexible as possible, and thus usually are realized in software. Such decoding software is particularly flexible if it is generic, i.e., programmed to fit many protocols. The protocol descriptions required at any point in time with respect to a specific application are loaded into the generic decoding software. As shown in FIG. 1 protocol descriptions A-X are loaded into a known generic decoding device. Then coded data are supplied at an input and decoded data are available for further processing at an output.

The disadvantage of this generic decoding software approach is that the software is not as efficient as specific software adapted especially for the existing protocol. In particular the disadvantages relate to run times which impact realtime applications. This is because the loaded protocol descriptions have to be interpreted by the generic decoding software. Such generic decoding software has only a limited set of commands for the protocols to be loaded. When a new protocol description is loaded into the generic decoder, it may happen that the set of available commands does not allow the expression of certain rules of the new protocol description. This requires modification of the generic decoder, resulting in considerable maintenance and modification effort. This is due to the fact that the continual inclusion of new protocols makes the generic decode software become very complex, and extensions of the decoder software may result in parts that have previously functioned to suddenly not work anymore in the manner intended.

The alternative, as shown in FIG. 2, is to program a specific decoder for the protocol or protocols to be analyzed, which as a result allows both rapid and clear analysis. However for each new protocol, and particularly the most diverse protocol dialects, a completely new software decoder has to be programmed, resulting in a great deal of effort and hence in high costs.

In other words a generic decoder into which protocol descriptions may be loaded may be likened to a processor which, while not being designed specifically for any particular application, processes everything, although slowly. Whereas a specific decoder may be likened to a processor that was designed for a specific application, i.e., the program to be executed is cast in concrete.

What is desired is a decoding device that works as fast as possible while being maintenance friendly and clearly laid out.

BRIEF SUMMARY OF THE INVENTION

Accordingly the present invention provides a decoding device that has a generic decoder into which at least one protocol description of a communication protocol is loaded, the communication protocol being capable of being interpreted by the generic decoder, and a specific decoder designed for a certain protocol description. The generic decoder is limited to a certain size so as not to cause runtimes of an unwanted scale, and is supplemented by the specific decoder which is particularly suited to the protocol being analyzed at that point in time. The generic and specific decoders are reversibly connected to form the decoding device.

The objects, advantages and other novel features of the present invention are apparent from the following detailed description when read in conjunction with the appended claims and attached drawing.

DETAILED DESCRIPTION OF THE INVENTION

Figure 1:
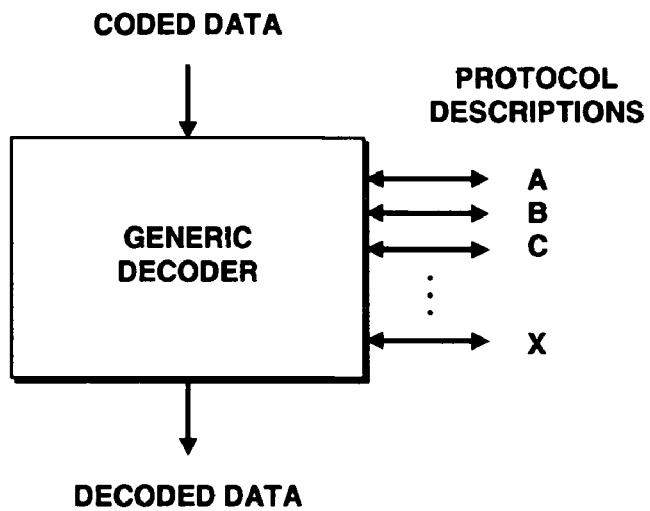
FIG. 1 is a general block diagram view of a generic decoder according to the prior art.
Figure 2:
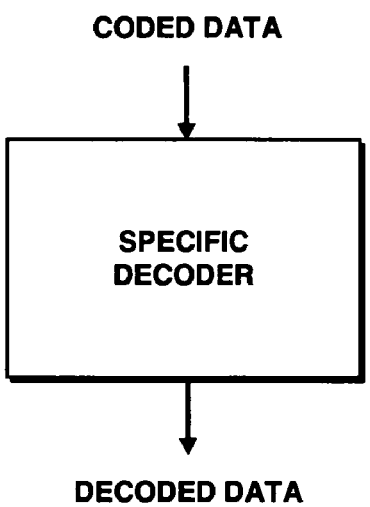
FIG. 2 is a general block diagram view of a specific decoder according to the prior art.
Figure 3:
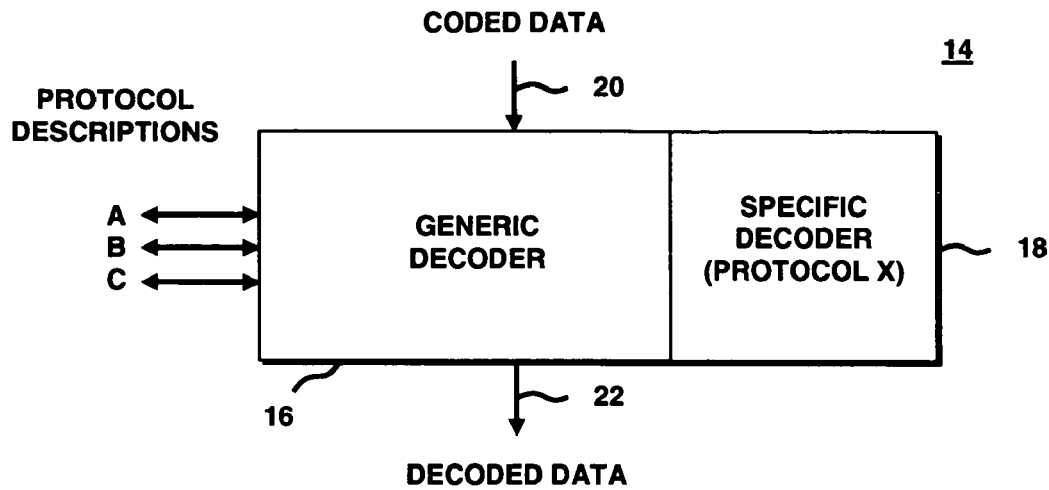
FIG. 3 is a general block diagram view of a first embodiment of a decoding device according to the present invention.

Referring now to FIG. 3 a decoding device 14 has a generic decoder 16 into which a limited number of protocol descriptions A-C may be loaded. These protocol descriptions are interpreted by the generic decoder 16 during operation of the decoding device 14. The decoding device 14 also has a specific decoder 18 which is adapted to especially for a specific protocol X, i.e. no interpretation takes place in the specific decoder during operation of the decoding device. Coded data are supplied at an input 20 of the decoding device 14 and decoded data are provided at an output 22.

The connection, or linking, of the generic decoder 16 with the specific decoder 18 is reversible, i.e., the individual components of the decoding device 14 may be maintained or updated separately without the need to generate the specific or generic decoders anew.

Figure 4:
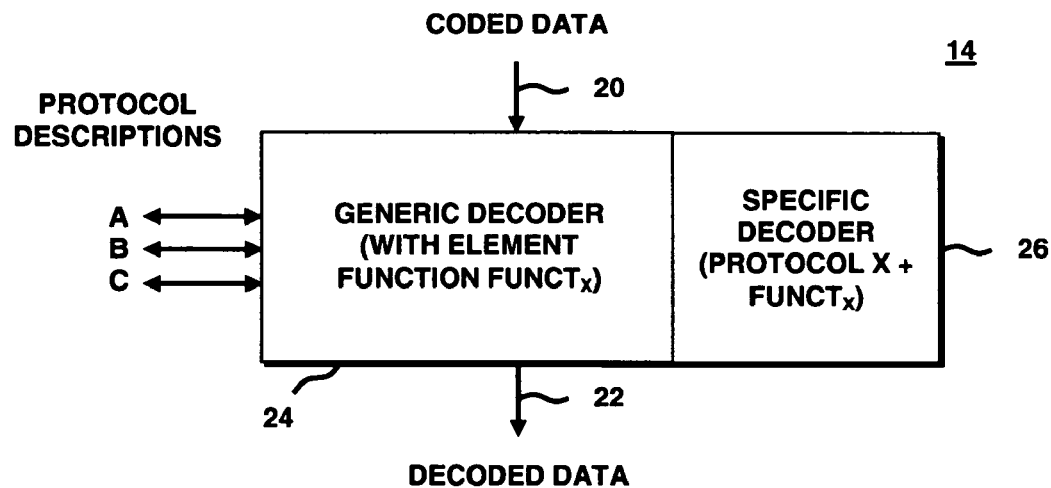
FIG. 4 is a general block diagram view of a second embodiment of a decoding device according to the present invention.

In the decoding device 14 shown in FIG. 4 the generic decoder 24 has element functions, funct$_x$, that are overlaid by corresponding element functions of the specific decoder 26 for protocol X. During operation of the decoding device 14 the overlaid element functions may be interpreted by the generic decoding 24.

Thus the present invention provides a decoding device that has a limited generic decoder and a specific decoder that are reversibly linked or connected so that each decoder may be maintained or updated separately.

What is claimed is:

1. A decoding device for analyzing communication protocols, the decoding device having an input for receiving coded data and an output for providing decoded data, comprising:
   a generic decoder into which a limited number of protocol descriptions are loaded, the protocol descriptions being interpreted by the generic decoder during operation of the decoding device to decode the coded data at the input to the decoded data at the output; and
   a specific decoder adapted to interpret a specific protocol, wherein an element function of the generic decoder is overlaid by a corresponding element function of the specific decoder so the corresponding element function is interpreted by the generic decoder.

2. The decoding device as recited in claim 1 wherein the generic and specific decoders are reversibly connected so each decoder is modifiable separately from the other.

3. A method of setting up a decoding device comprising the steps of:
   providing a generic decoder into which a limited number of protocol descriptions are loaded, the protocol descriptions being interpreted by the generic decoder to decode coded data at an input into decoded data at an output;
   providing a specific decoder adapted to interpret a specific protocol;
   connecting the specific and generic decoders to form the decoding device; and
   overlaying an element function of the generic decoder with a corresponding element function of the specific decoder so the corresponding element function is interpreted by the generic decoder.

4. The method as recited in claim 3 wherein the connecting step comprises the step of reversibly connecting the specific and generic decoders so each decoder is modifiable separately from the other.

* * * * *